United States Patent [19]
Longenecker

[11] Patent Number: 6,027,163
[45] Date of Patent: *Feb. 22, 2000

[54] JUVENILE CARRIER WITH MOVEABLE CANOPY

[75] Inventor: Michael L. Longenecker, Ephrata, Pa.

[73] Assignee: Graco Children's Products Inc., Elverson, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/927,398

[22] Filed: Sep. 10, 1997

[51] Int. Cl.$^7$ ......................................................... A47C 7/62
[52] U.S. Cl. .............................. 297/184.13; 297/184.11; 297/184.17; 135/133; 135/96
[58] Field of Search ........................... 297/184.1, 184.11, 297/184.13, 184.17; 35/133, 96, 132, 135; 5/416

[56] References Cited

U.S. PATENT DOCUMENTS

| | | |
|---|---|---|
| 65,085 | 5/1867 | Hunter .................................... 135/133 |
| D. 313,912 | 1/1991 | Kosciusko et al. ....................... D6/500 |
| D. 331,208 | 11/1992 | Peebles et al. .......................... D12/129 |
| D. 375,473 | 11/1996 | Huang .................................... D12/129 |
| 2,689,579 | 9/1954 | Sartori ................................... 135/133 |
| 4,343,322 | 8/1982 | Fiddler ................................... 135/133 |
| 4,579,385 | 4/1986 | Koenig ................................... 297/184 |
| 4,583,779 | 4/1986 | Myers .................................... 297/184 |
| 4,784,433 | 11/1988 | Purnell-Ayres ......................... 297/184 |
| 4,785,838 | 11/1988 | Negahdari .............................. 135/117 |
| 4,810,030 | 3/1989 | Lewis ..................................... 297/184 |
| 4,858,990 | 8/1989 | Combs-Rose et al. .................. 297/184 |
| 4,883,315 | 11/1989 | Ferguson ................................ 297/184 |
| 4,978,166 | 12/1990 | James .................................... 297/184.13 |
| 5,188,380 | 2/1993 | Tucek ..................................... 280/30 |
| 5,322,343 | 6/1994 | Parker et al. ........................... 297/183 |
| 5,551,745 | 9/1996 | Huang .................................... 135/133 |
| 5,695,100 | 12/1997 | O'Brien .................................. 297/184.17 |

OTHER PUBLICATIONS

Sell sheet, Juvenile carrier with movable canopy; Cosco, Inc., 2525 State Street, Columbus, Indiana 47201. Publication date Mar., 1997.

Pp. 1, 22 and 25, Juvenile carriers with movable canopies; Century Products Company, 9600 Valley View Road, Macedonia, Ohio 44056. Publication date 1996.

Pp. 2, 3, 4 and 5, Juvenile carriers with movable canopies; Evenflo Company, Inc., a Lisco Company, 601 South Harbour Island Boulevard, Suite 200, Tampa, Florida 33602. Publication date 1996.

*Primary Examiner*—Anthony D. Barfield
*Attorney, Agent, or Firm*—Foley & Lardner

[57] ABSTRACT

The improved canopy preferably includes a flexible material and a first bow adapted to be connected to a juvenile product and connected to a first edge of the flexible material. The first bow includes a rotational bearing surface to allow for adjustment to a variety of angles with respect to the juvenile product. The improved canopy also includes a second bow adapted to be connected to the juvenile product and connected to a second edge of the flexible material, the second bow includes a rotational bearing surface to allow for adjustment to a variety of angles with respect to the juvenile product.

36 Claims, 7 Drawing Sheets

JUVENILE CARRIER WITH MOVEABLE CANOPY

RELATED APPLICATIONS

This application is related to several other patent applications which are commonly owned by the Assignee of this application. Those related applications are: (Attorney docket number 027284-5426) by inventors Greger et al., filed Sep. 10, 1997.

BACKGROUND OF THE INVENTION

1. Field of the Invention

The following invention is directed to a juvenile carrier that protects a juvenile from sunlight and the elements, and more particularly to a juvenile carrier with a movable canopy to protect the juvenile.

2. Description of the Related Art

Juvenile carriers are popular in the children's product market and take on a variety of forms. For example, the carrier may be a bassinet, car seat, stroller, or the like. Conventional carriers may utilize a canopy to protect the juvenile from sunlight or other elements. Some conventional canopies generally include one unmovable canopy edge connected to the carrier frame and a second movable canopy edge to allow the canopy to expand from a folded configuration to a deployed, open configuration.

Conventional juvenile carriers with canopies, as described above, suffer from several short-comings. For example, many conventional canopies fail to adequately protect the juvenile from the sunlight in all situations. This is particularly the case when sunlight is directed towards the juvenile at low angles. At low angles the sunlight cannot be blocked by the conventional canopy, thereby failing to protect the juvenile. This situation is even further exacerbated when the juvenile is being transported in a vehicle. During the trip the vehicle may make changes in direction, pitch, etc. and this substantially increases the opportunity for sunlight to be directed towards to juvenile at low angles.

Conventional canopies were permanently affixed to the device on which they were used. Other conventional canopies allow removal, but their removal was often difficult, time consuming, required the use of tools, and/or sometimes required the assistance of another person. Furthermore, the conventional attachment mechanisms are generally more complex and expensive to manufacture and do not allow the canopy to experience a full range of motion from the head to the foot of the juvenile carrier.

Accordingly, there is a need for an improved juvenile carrier with a canopy which is easy to manufacture, use, and which protects the juvenile from low angle sunlight

SUMMARY OF THE INVENTION

Accordingly, the present invention is directed to a juvenile carrier with a canopy that substantially obviates one or more of the disadvantages of the conventional juvenile carriers with a canopy.

An object of the present invention is to provide a juvenile carrier with a canopy that allows the user to adjust a first edge and a second edge of the canopy, supported by a first and second bow, respectively, to a variety of angles with respect to the juvenile product.

Another object of the present invention is to provide a bow that allows easy adjustment, attachment, and removal of the canopy.

A further object of the present invention is to provide a bow with a coupling portion that allows easy coupling and uncoupling.

A still further object of the present invention is to provide more easily and economically manufacturable bow and engaging hub manufactured.

Additional features and advantages of the invention will be set forth in the following description, and in part will be apparent from the description, or may be learned by practice of the invention. The objectives and other advantages of the invention will be realized and attained by the structure particularly pointed out in the written description and claims as well as the appended drawings.

To achieve these and other advantages in accordance with the purpose of the present invention, as embodied and broadly described, the present invention includes a canopy adapted to be connected to a juvenile product to provide protection from sunlight including a flexible material a first bow adapted to be connected to the juvenile product and connected to a first edge of the flexible material, the first bow including a rotational bearing surface to allow for adjustment to a variety of angles with respect to the juvenile product, and a second bow adapted to be connected to the juvenile product and connected to a second edge of the flexible material, the second bow including a rotational bearing surface to allow for adjustment to a variety of angles with respect to the juvenile product.

Another aspect of the invention includes a juvenile carrier adapted to provide protection from sunlight, including a frame adapted to receive a juvenile (in a sitting or lying position) including a connection portion, a first bow adapted to be connected to the connection portion of the frame, the first bow including a rotational bearing surface to allow for adjustment to a variety of angles with respect to the frame, a second bow adapted to be connected to the connection portion of the frame, the second bow including a rotational bearing surface to allow for adjustment to a variety of angles with respect to the frame and a flexible material having a first edge connected to the first bow and a second edge connected to the second bow.

A further aspect of the present invention includes a juvenile carrier adapted to provide protection from sunlight, including a frame adapted to receive a juvenile including a connection portion, the frame having a head portion and a foot portion, a first and a second bow adjustably connected to the connection portion of the frame and a flexible material having a first edge and a second edge connected to the first and second bows, respectively, such that the first and second bows are capable of being adjusted between a first position and a second position wherein the first edge of the flexible material is disposed substantially adjacent the head portion of the frame in the first position and the second edge of the material is disposed substantially adjacent the foot portion of the frame in the second position.

It is to be understood that both the general description above, and the following detailed description are explanatory and are intended to provide further explanation of the invention as claimed.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

The juvenile carrier according to the present invention includes a frame adapted to receive a juvenile (in a sitting or lying position) including a connection portion, a first bow adapted to be connected to the connection portion of the frame, the first bow including a rotational bearing surface to allow for adjustment to a variety of angles with respect to the frame, a second bow adapted to be connected to the connection portion of the frame, the second bow including a rotational bearing surface to allow for adjustment to a variety of angles with respect to the frame, and a flexible material having a first edge connected to the first bow and a second edge connected to the second bow.

Figure 1A:
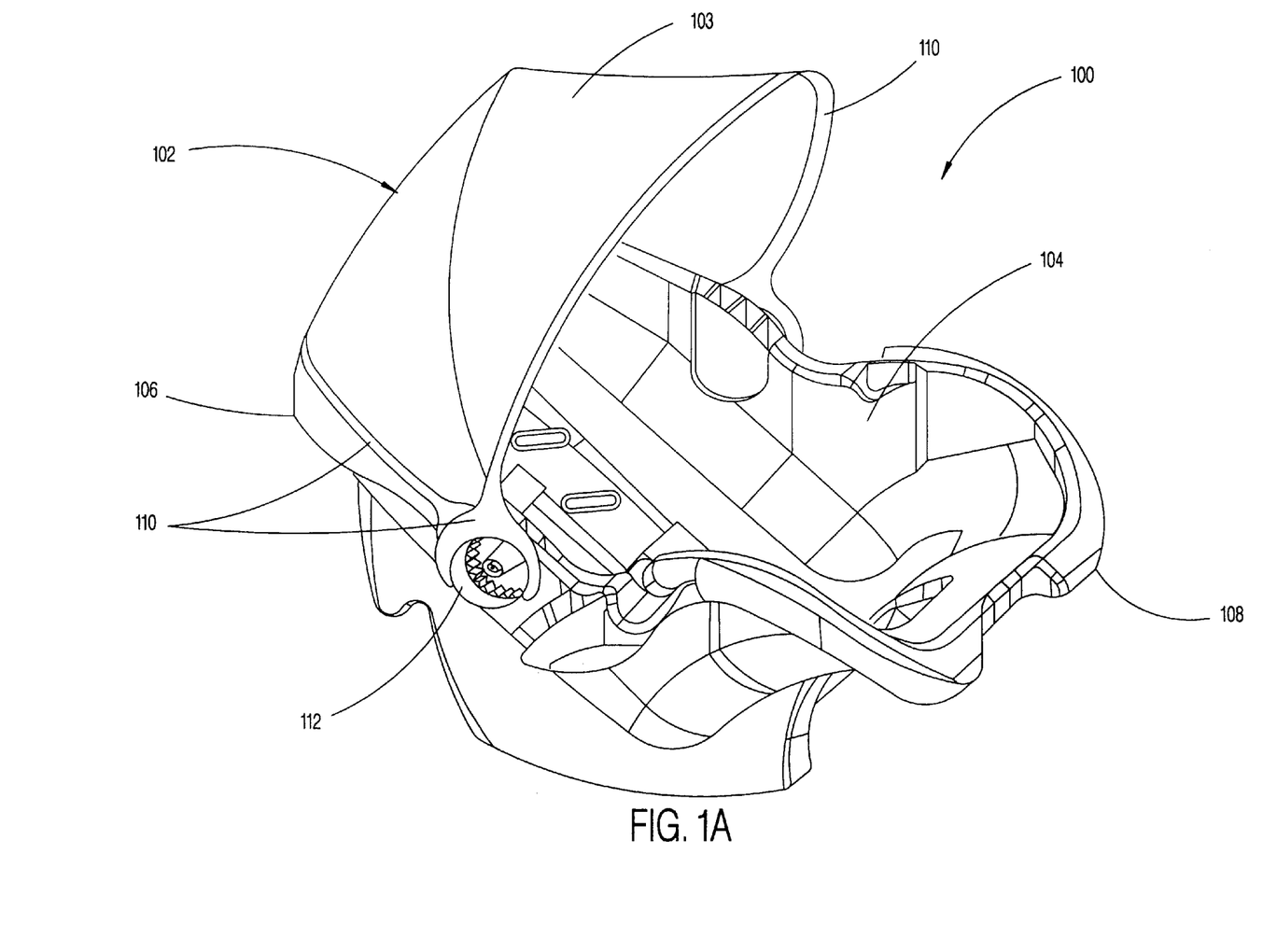
FIGS. 1A and 1B are isometric views of a juvenile carrier with an attached movable canopy in an upper and lower configuration in accordance with the present invention.

For example, FIG. 1A shows a preferred embodiment of a movable canopy 102 attached to a juvenile carrier 100 in accordance with the present invention. Juvenile carrier 100 generally comprises a frame 104, which includes a head portion 106, a foot portion 108, and a connection portion 112, preferably comprising a hub. In the preferred embodiment the juvenile carrier is a car seat. The juvenile carrier 100 and the preferred hub 112 may be constructed of any appropriate rigid material. For example, the juvenile carrier 100 and hub 112 may be constructed of a high-strength plastic, preferably an injection molded plastic.

The canopy according to the present invention includes a flexible material, a first bow adapted to be connected to the juvenile product and connected to a first edge of the flexible material, the first bow including a rotational bearing surface to allow for adjustment to a variety of angles with respect to the juvenile product, and a second bow adapted to be connected to the juvenile product and connected to a second edge of the flexible material, the second bow including a rotational bearing surface to allow for adjustment to a variety of angles with respect to the juvenile product.

For example, the canopy shown in FIG. 1A includes a flexible material 103, suitable for blocking sunlight or other elements from a juvenile, supported by at least two bows each designated by reference number 110. In the preferred embodiment the flexible material 103 of canopy 102 may be made of fabric and is collapsible and the bows 110 may be constructed of any appropriate resilient material adapted to be connected to the hub 112. For example, the bow 110 may be constructed of a high-strength plastic. In the most preferred embodiment both bows 110 shown in FIG. 1A are substantially identical in structure.

Figure 1B:
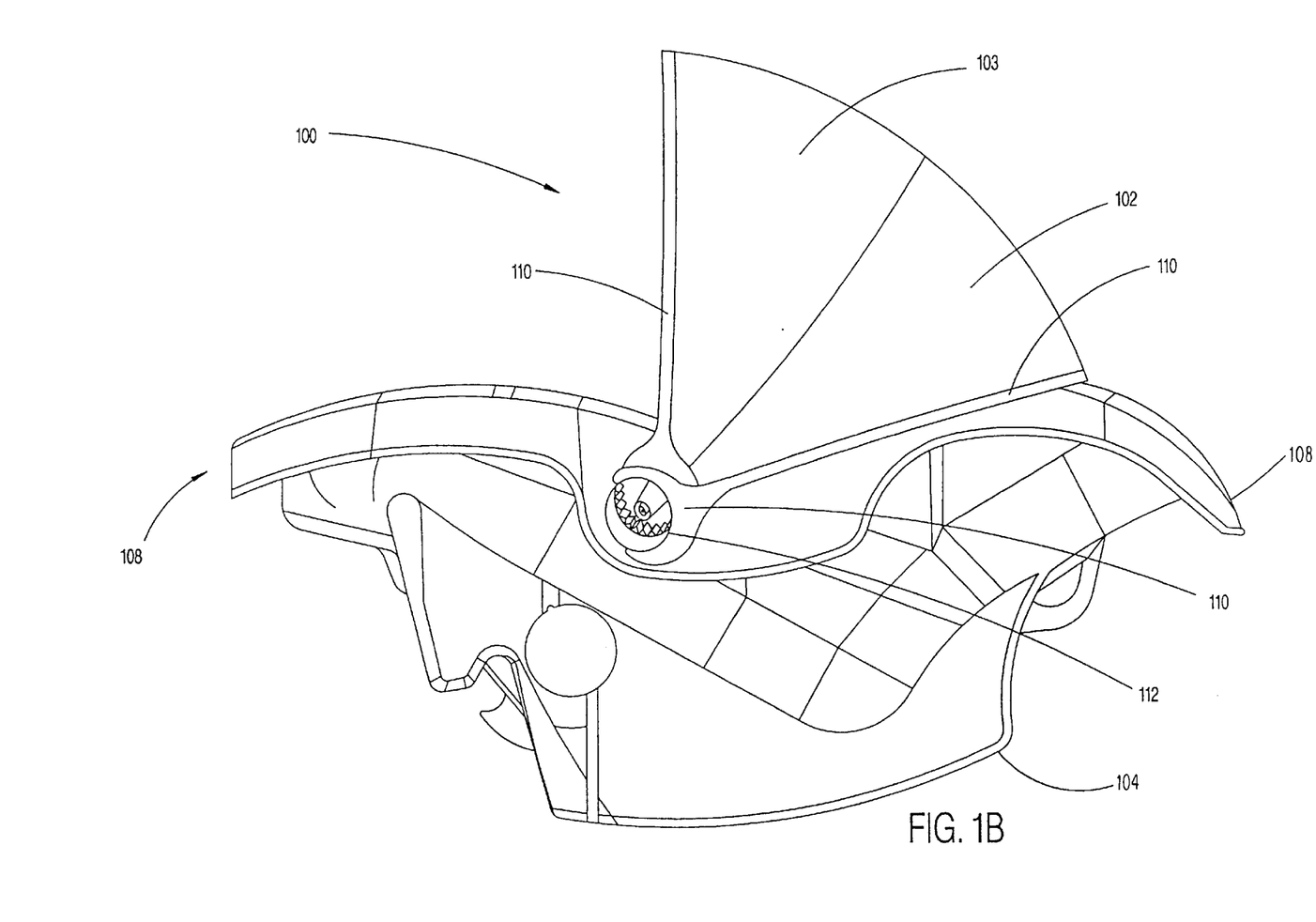

FIG. 1B shows the movable canopy 102 of the present invention in a different lower position. As can be appreciated, this lower configuration advantageously provides for protection form sunlight at a low angle. In its broader aspects, the present invention advantageously allows for a movable canopy 102 that can be adjusted between a plurality of positions, including the configurations shown in FIGS. 1A and 1B, as explained in more detail hereinafter.

Figure 2:
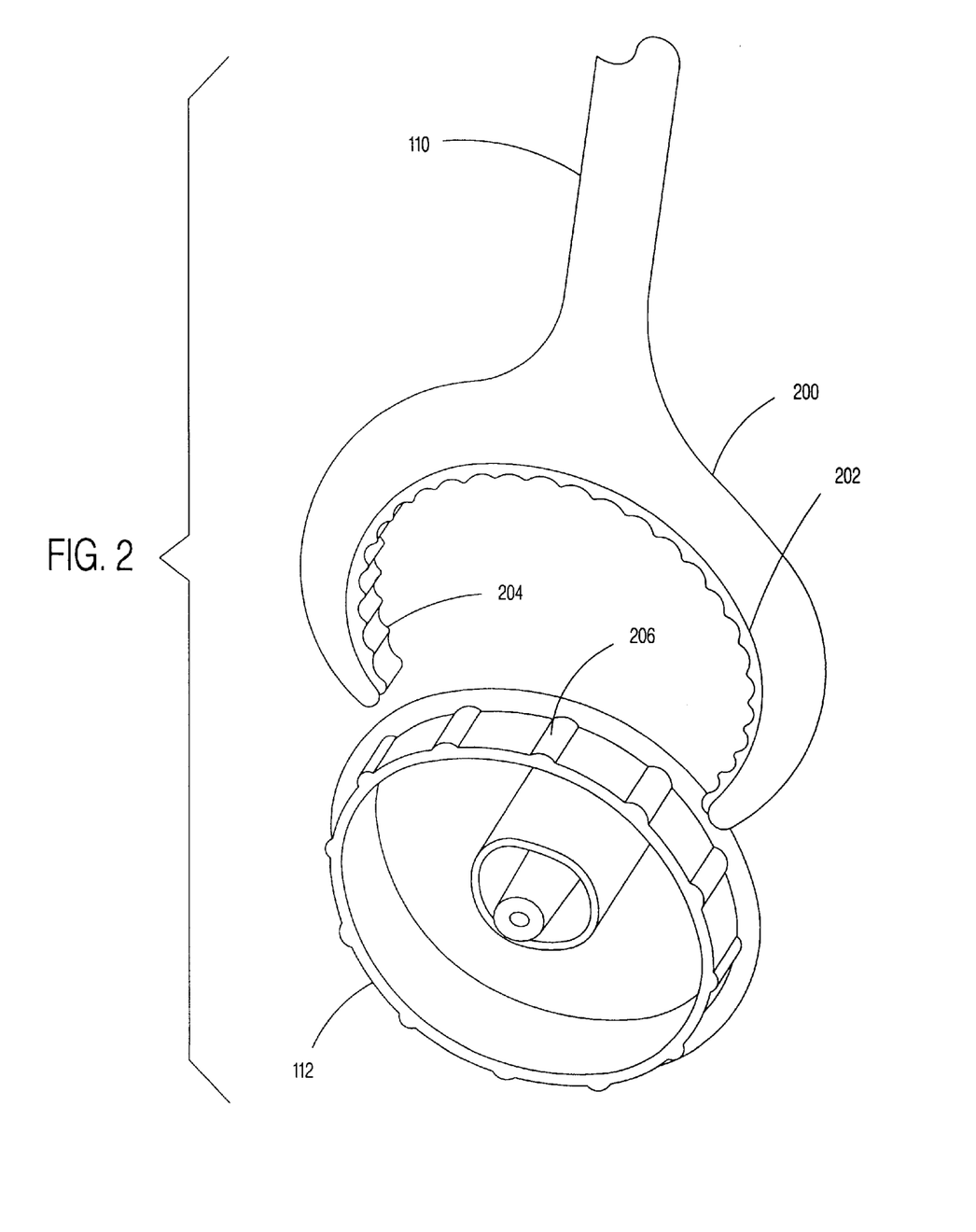
FIG. 2 is an enlarged isometric view of a c-shaped connection portion of a bow and the connection moving member in accordance with the present invention.

FIG. 2 shows an isometric view of a preferred bow 110 and the hub 112 just prior to engagement. The bow 110 includes a c-shaped portion 200, at both ends, which includes the rotational bearing surface. A rib 202 reinforces the rotational bearing surface adapted to be coupled to the hub 112. The rotational bearing surface, in the preferred embodiment, includes a plurality of equally spaced engaging teeth 204 adapted to be coupled to engagement protrusions 206 of the hub 112. In the preferred embodiment, the hub 112 has two adjacent engagement protrusions at equally space intervals about the circumferential surface of the hub 112. In a preferred embodiment the engagement protrusions 206 are space apart at 30°. The above described configuration of the engagement protrusions 206 is such that two bows 110 are capable of engaging the hub 112 simultaneously in a side-by-side configuration. The engaging teeth 204, in the preferred embodiment, are spaced apart at 10° intervals along the circumferential surface defined by the reinforcing rib 202 of the c-shaped portion 200.

Figure 3:
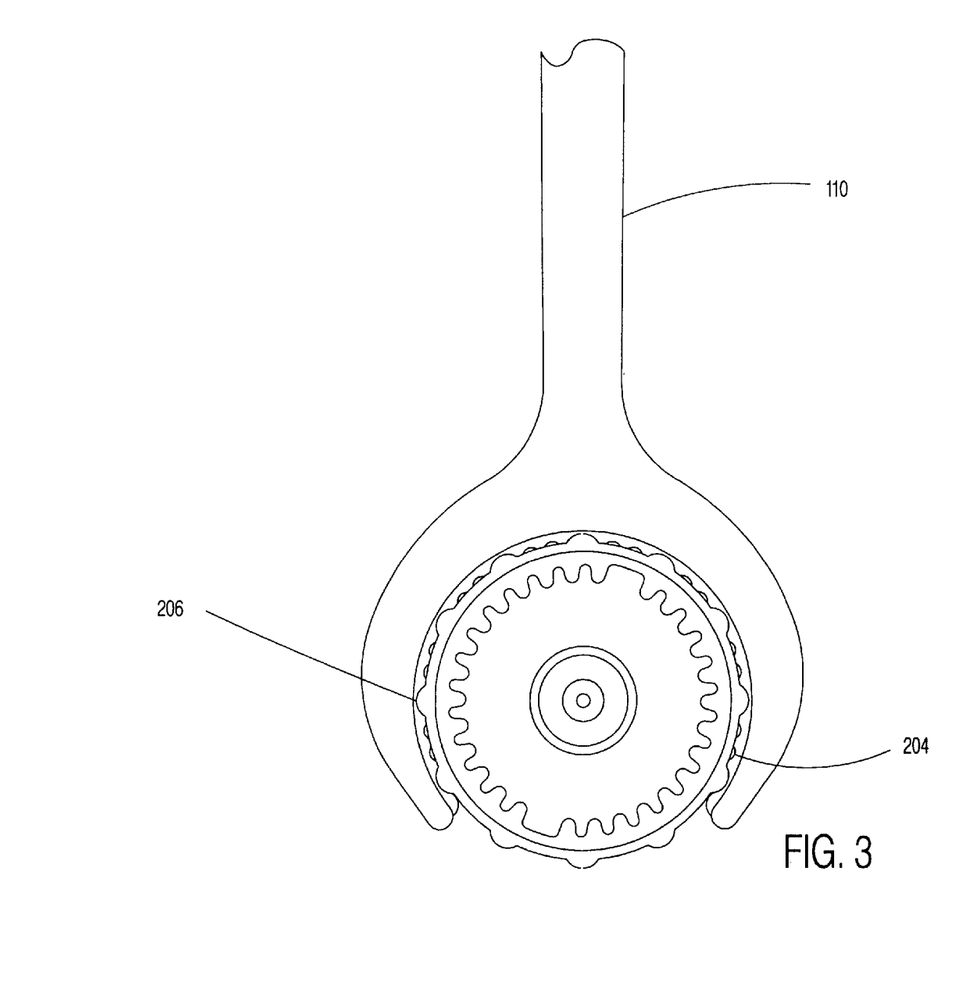
FIG. 3 is an end view of a c-shaped connection portion of a bow engaged with the connection moving member in accordance with the present invention.

FIG. 3 shows a view of the bow 120 engaged to hub 112. As can be seen from FIG. 3, one of every three of the engaging teeth 204 contacts and securely engages the engagement protrusions 206 of the hub 112. In this configuration the first and second edges of the canopy 102, as shown in FIG. 1A, may be easily and securely rotate through an arc, the end points of the arc defined by the head portion 106 and the foot portion 108 of the frame 104, respectively, of the juvenile carrier 100, at preferred 10° intervals, of course any desired interval could be used. The care giver can thus precisely adjust the first and second edges of the canopy 102 to provide protection to the juvenile from sunlight entering at a variety of angles, and in particular low angles.

Figure 4:
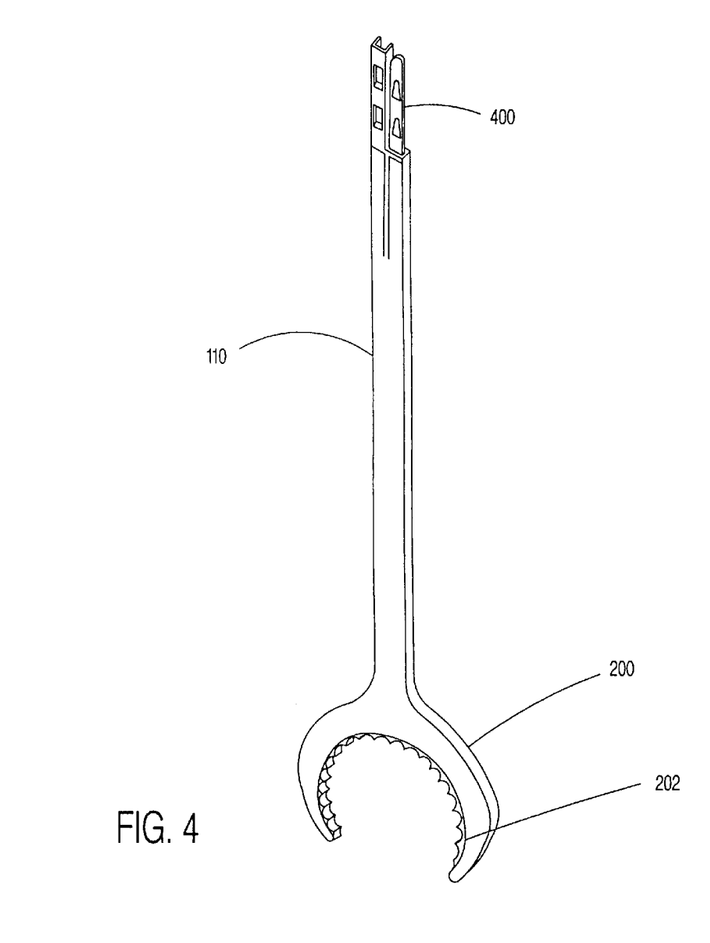
FIG. 4 is an isometric view of a bow having a c-shaped end and bow coupling end.

FIG. 4 shows a bow component of an exemplary embodiment of the present invention, which bow can be seen in two-piece construction. In this exemplary embodiment the bow component includes a coupling portion 400 at one end. In this embodiment, two identical bow components are coupled together by two coupling portions 400 to form the bow 110. The coupling portion 400 will now be further described with reference to FIGS. 5 and 6.

Figure 5:
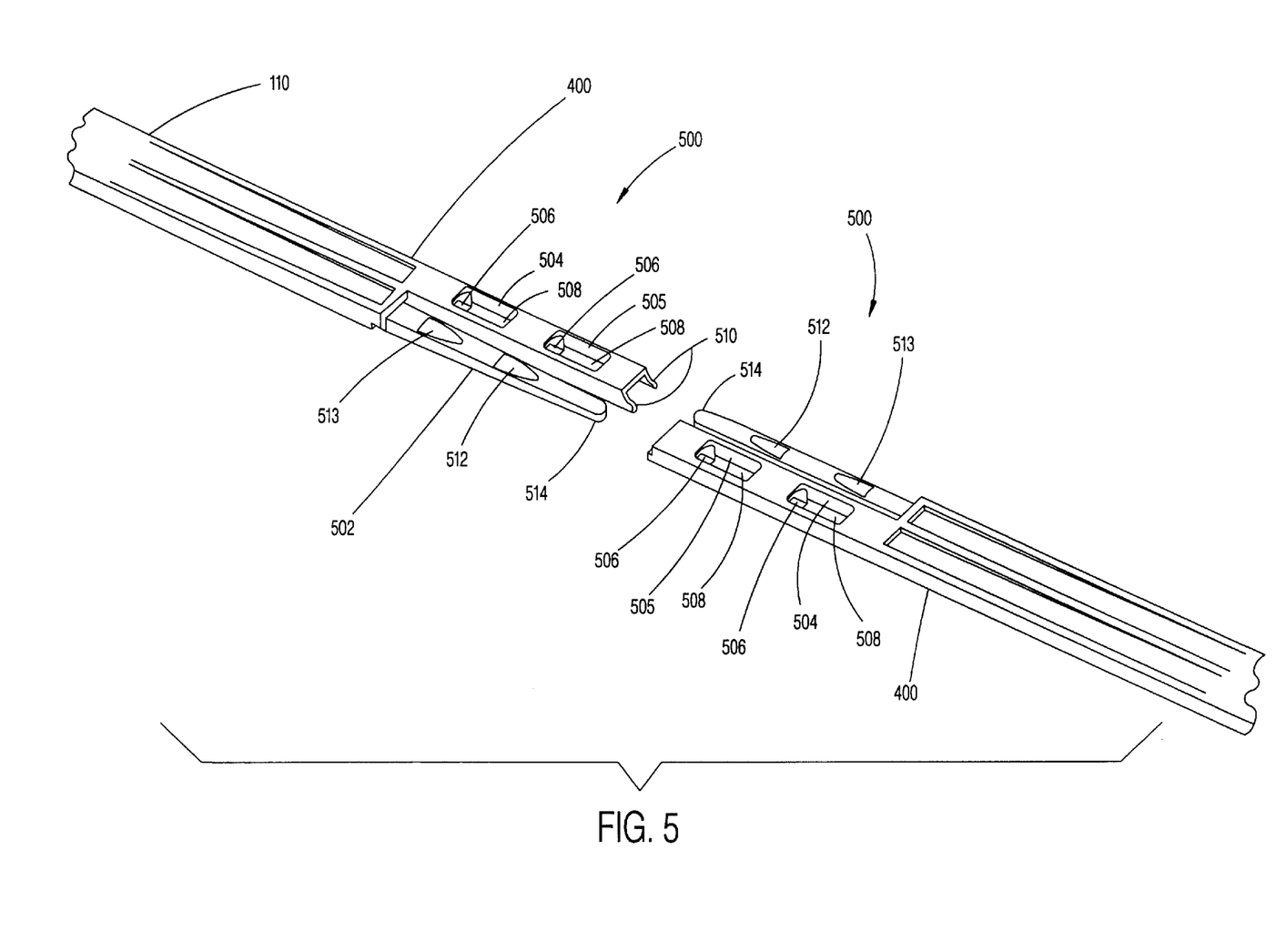
FIG. 5 is an enlarged isometric view of two bow coupling connections, in alignment just prior to coupling.

FIG. 5 shows an enlarged view of coupling portion 400 of a first half of the bow component in alignment with an inverted coupling portion 400 of a second half of the bow component just prior to engagement. As depicted in FIG. 5, the coupling portion 400 has a receiving channel 500 adapted to receive an extending member 502. The bow components are easily attached to each other by inserting both extending members 502 into the opposite receiving channels 500 of the coupling portion 400 of each of the respective bow components until securely mated.

Turning now to the specifics of the coupling portion 400, the receiving channel 500 includes a first orifice 504 and a second orifice 505 formed within the receiving channel 500. Formed within the orifices 504, 505 is an opening 506 and a recessed portion 508. The receiving channel 500 has two ribs 510 defining the receiving channel and extending a distance along the length of the receiving member 500 to a point beyond the second orifice 504, are adapted to receive and guide the extending member 502 to its secure mating position.

The extending member 502 includes a first protrusion 512 and a second protrusion 513. The protrusions 512 and 513 are formed with a general ramped slope configuration with a narrow leading edge expanding at the rear edge. The extending member 502 further includes a rounded edge 514 to facilitate insertion into the receiving channel 500.

The coupling of the bow components via each of the coupling portions 400 is accomplished by the user aligning the coupling portion 400 of one bow component with an identical inverted coupling portion 400 of a second bow component. The rounded edge 514, at the distal end of the extending member 502, is inserted into the receiving channel 500 and the two coupling portions 400 are urged towards each other. The first protrusion 512 is inserted past the first orifice 505 and continues until it engages the second orifice 504. The connection is completed when the rear edge of the ramped slope protrusion 512 extends past the recessed portion of 508 of the second orifice 504 and extends upwardly into the opening 506. The same type of connection is performed with respect to the first orifice 505 and the second extending member 513.

The coupling portion 400 is easily detached by the user by pushing the protrusions 512 and 513 through the opening 506 of the orifices 504 and 505 until the protrusions 512 and 513 clear orifices 504 and 505. Then the respective bow components can be pulled in opposite directions to disassemble the bow 110.

Figure 6:
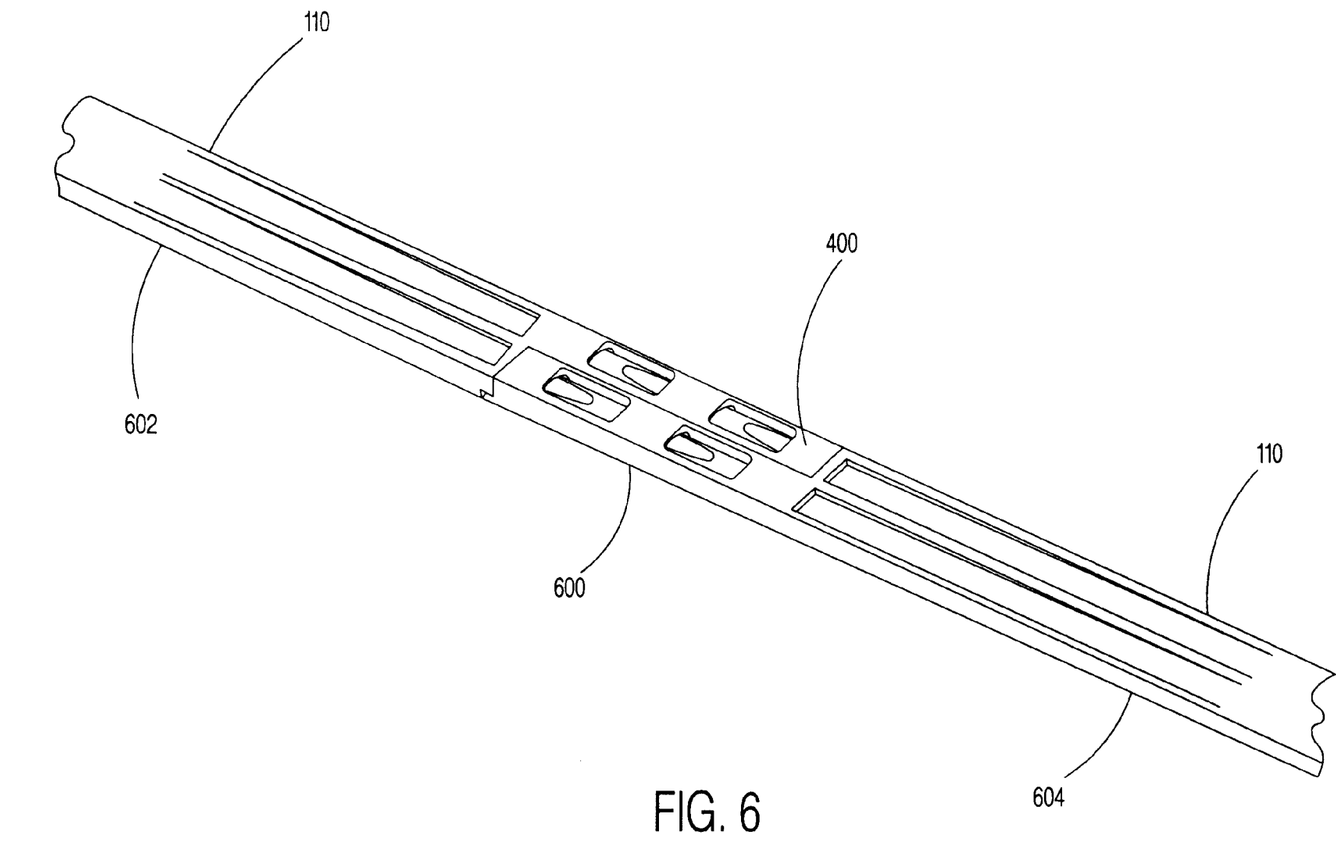
FIG. 6 is an enlarged isometric view of the two bow coupling connections of FIG. 5 coupled together.

FIG. 6 shows coupling portions 400 of the bow components securely engaged, as described above. A preferred feature of the coupling portions 400 relates to a difference in the thickness between the bow 110 at a portion away from the coupling portion 400, such as indicated at 602, 604, and the coupling portion 400. Specifically, as shown in FIG. 6, the coupling portion 400 is formed to a greater thickness at a portion indicated at reference numeral 600, than the bow 110 at reference numerals 602 and 604. The extra thickness of the coupling portion 400 is incorporated into the preferred embodiment of the present invention to improve its mechanical characteristics. For example, the extra thickness provides uniform curvature of the bow 110 throughout its entire length in the installed position, and provides additional mechanical strength to coupling portion 400.

It will be apparent to those skilled in the art that various modifications and variations can be made in the movable canopy of the present invention without departing from the spirit or scope of the invention. Thus, it is intended that the present invention cover the modifications and variations of this invention provided they come within the scope of the appended claims and their equivalents.

What is claimed is:

1. A canopy for a juvenile product to provide protection from sunlight, comprising:
    a flexible material;
    a first bow connected to a first edge of the flexible material, the first bow including a c-shaped connecting end portion adapted to be pivotally and detachably connected to the juvenile product to allow the first bow to be adjustably positioned relative to the juvenile product; and
    a second bow connected to a second edge of the flexible material, the second bow including a substantially c-shaped connecting end portion adapted to be pivotally and detachably connected to the juvenile product to allow the second bow to be adjustably positioned relative to the juvenile product.

2. A canopy according to claim 1, wherein the flexible material is a fabric.

3. A canopy according to claim 1, wherein the c-shaped connecting end portions of the first and second bows each include a rotational bearing surface.

4. A canopy according to claim 3, wherein the rotational bearing surface further includes a plurality of adjacently disposed engaging teeth.

5. A canopy according to claim 1, wherein the first and second bows each comprise a first bow component and a second bow component.

6. A canopy according to claim 5, wherein the first bow component and the second bow component each further include a coupling portion.

7. A canopy according to claim 6, wherein the coupling portion comprises an extending member and a receiving channel.

8. A canopy according to claim 5, wherein the first bow component and the second bow component are substantially identical.

9. A canopy according to claim 8, wherein the first bow component and second bow component are made of a resilient material.

10. A canopy according to claim 1, wherein the first bow and the second bow are each made of a resilient material.

11. A juvenile carrier comprising:
    a frame including a connection portion;
    a first bow having a substantially c-shaped connecting end portion pivotally and detachably connected to the frame connection portion, the frame connecting portion and the c-shaped connecting end portion of the first bow allowing the first bow to be adjustably positioned relative to the frame;
    a second bow having a substantially c-shaped connecting end portion pivotally and detachably connected to the frame connection portion, the frame connecting portion and the c-shaped connecting end portion of the second bow allowing the second bow to be adjustably positioned relative to the frame; and
    a flexible material having a first edge connected to the first bow and a second edge connected to the second bow, the flexible material being adapted to provide sunlight protection.

12. A juvenile carrier according to claim 11, wherein the frame is a car seat carrier.

13. A juvenile carrier according to claim 11, wherein the frame connecting portion is a hub.

14. A juvenile carrier according to claim 13, wherein the hub further includes a plurality of engagement protrusions.

15. A juvenile carrier according to claim 11, wherein the c-shaped end portions of the first and second bows each include a rotational bearing surface.

16. A juvenile carrier according to claim 5, wherein the rotational bearing surface further includes a plurality of adjacently disposed engaging teeth.

17. A juvenile carrier according to claim 11, wherein the first and second bows each comprise a first bow component and a second bow component.

18. A juvenile carrier according to claim 17, wherein the first bow component and the second bow component each further include a coupling portion.

19. A juvenile carrier according to claim 18, wherein the coupling portion comprises an extending member and a receiving channel.

20. A juvenile carrier according to claim 17, wherein the first bow component and the second bow component are substantially identical.

21. A juvenile carrier according to claim 20, wherein the first bow component and second bow component are made of a resilient material.

22. A juvenile carrier according to claim 11, wherein the flexible material is a fabric.

23. A juvenile carrier comprising:
- a frame including a connection portion, a head portion, and a foot portion;
- a first bow and a second bow each including a substantially c-shaped connecting end portion pivotally and detachably connecting to the frame connection portion, the c-shaped connecting end portions of the first and second bows and the frame connecting portion allowing the first and second bows to be adjustably positioned relative to the frame; and
- a flexible material having a first edge and a second edge connected to the first and second bows, respectively, the flexible material being adapted to provide sunlight protection,
- wherein the first and second bows are adjustable between a first position where the first edge of the flexible material is disposed substantially adjacent to the head portion of the frame and a second position where the second edge of the material is disposed substantially adjacent to the foot portion of the frame.

24. A juvenile carrier according to claim 23, wherein the frame is a car seat carrier.

25. A juvenile carrier according to claim 23, wherein the frame connection portion is a hub.

26. A juvenile carrier according to claim 25, wherein the hub further includes a plurality of engagement protrusions.

27. A juvenile carrier according to claim 23, wherein the c-shaped connecting end portions each include a rotational bearing surface.

28. A juvenile according to claim 27, wherein the rotational bearing surface further includes a plurality of adjacently disposed engaging teeth.

29. A juvenile carrier according to claim 23, wherein the first and second bows each further comprise a first bow component and a second bow component.

30. A juvenile carrier according to claim 29, wherein the first bow component and the second bow component each further includes a coupling portion.

31. A juvenile carrier according to claim 30, wherein the coupling portion comprises an extending member and a receiving channel.

32. A juvenile carrier according to claim 29, wherein the first bow component and the second bow component are substantially identical.

33. A juvenile carrier according to claim 23, wherein the first and second bows are made of a resilient material.

34. A juvenile carrier according to claim 23, wherein the flexible material is a fabric.

35. A canopy adapted to be detachably connected to a juvenile product to provide protection from sunlight, the canopy comprising:
- a flexible material; and
- a first bow connected to a first edge of the flexible material, the first bow including a substantially c-shaped connecting end portion adapted to be pivotally and detachably connected to the juvenile product for adjusting the first bow relative to the juvenile product.

36. A canopy adapted to be connected to a juvenile product, the canopy comprising:
- a flexible material; and
- a bow connected to a first edge of the flexible material, the bow comprising a first bow component having a first coupling portion and an identical second bow component having a second coupling portion, the first and second coupling portions being inverted relative to each other to form a complimentary coupling the first bow component and the second bow component being coupled together by interconnecting the first and second coupling portions, each of the first and second bow components having a connecting portion that connects to the juvenile product.

* * * * *